US009796955B2

(12) United States Patent
Wilson et al.

(10) Patent No.: US 9,796,955 B2
(45) Date of Patent: Oct. 24, 2017

(54) NATURAL AND STABLE SOLUTIONS OF ALPHA-ACIDS AND THEIR USE FOR THE IMPROVEMENT OF FOAM QUALITY OF BEER

(75) Inventors: Richard J. H. Wilson, Copthorne (GB); Harald Schwarz, Seattle, WA (US); Robert Smith, Yakima, WA (US)

(73) Assignee: S.S. STEINER, INC., New York, NY (US)

( * ) Notice: Subject to any disclaimer, the term of this patent is extended or adjusted under 35 U.S.C. 154(b) by 155 days.

(21) Appl. No.: 13/113,879

(22) Filed: May 23, 2011

(65) Prior Publication Data

US 2011/0287152 A1 Nov. 24, 2011

Related U.S. Application Data

(60) Provisional application No. 61/347,772, filed on May 24, 2010.

(51) Int. Cl.
*C12C 3/00* (2006.01)
*A23C 3/00* (2006.01)
*C12C 5/02* (2006.01)

(52) U.S. Cl.
CPC . *C12C 5/02* (2013.01); *C12C 3/00* (2013.01)

(58) Field of Classification Search
CPC ............... C12C 5/02; C12C 3/00; A23L 2/68
USPC ......................................... 426/329, 330, 600
See application file for complete search history.

(56) References Cited

U.S. PATENT DOCUMENTS

| | | | | |
|---|---|---|---|---|
| 3,486,906 A * | 12/1969 | Todd, Jr. | | 426/590 |
| 3,523,799 A * | 8/1970 | Rigby | | 426/429 |
| 3,730,730 A | 5/1973 | Rigby et al. | | 99/50.5 |
| 3,787,499 A * | 1/1974 | Grant | | 568/399 |
| 4,590,296 A | 5/1986 | Cowles et al. | | 568/366 |
| 4,647,464 A | 3/1987 | Todd, Jr. et al. | | 426/423 |
| 4,844,939 A * | 7/1989 | Todd, Jr. | | 426/600 |
| 5,200,227 A * | 4/1993 | Guzinski et al. | | 426/600 |
| 5,965,777 A | 10/1999 | Gauthier | | 568/347 |
| 6,242,038 B1 | 6/2001 | Guzinski et al. | | 426/600 |
| 6,583,322 B1 | 6/2003 | Shahlai et al. | | 568/341 |
| 6,849,287 B1 | 2/2005 | Rader et al. | | 426/600 |
| 2001/0031305 A1* | 10/2001 | Smith et al. | | 426/600 |
| 2007/0172543 A1* | 7/2007 | Ting et al. | | 426/15 |
| 2008/0113048 A1* | 5/2008 | Wilson et al. | | 424/778 |
| 2008/0160155 A1 | 7/2008 | Gimbel et al. | | 426/600 |
| 2010/0075015 A1 | 3/2010 | Ono et al. | | 426/600 |

FOREIGN PATENT DOCUMENTS

| | | | | |
|---|---|---|---|---|
| GB | 1058975 | 2/1967 | ............... | C12C 3/00 |
| WO | WO 93/02177 | 4/1993 | ............... | C12C 9/02 |
| WO | WO 00/68356 | 11/2000 | ............... | C12C 3/00 |

OTHER PUBLICATIONS

C.W. Banforth and G. Jackson in European Brewery Convention, Proceedings of the 19th Congress 1983, pp. 331-338.*
C.W. Banforth and G. Jackson in European Brewery Convention, Proceedings of the 19th Congress 1983, pp. 331-338.*
K. Asano and N. Hashimoto in Rept.Res. Lab. Kirin Brewery Co., Ltd., No. 19, 9-16, 1976.*
Ting et al., "Identification of Antiradical Hop Compounds", J. Am. Soc. Brew. Chem. 66(2):116-126, 2008 (abstract only).
PCT International Search Report, Application No. PCT/US11/37780, Aug. 25, 2011 (7 pgs).
Jaskula et al., "A Kinetic Study on the Isomerization of Hop α-Acids", J. Agric. Food Chem, 2008, 56, pp. 6408-6415.
Bishop et al., "A Scientific Basis for Beer Foam Formation and Cling", J. Inst. Brew, vol. 80, 1974 (pp. 68-80).
Asano et al., "Contribution of Hop Bitter Substances to Head Formation of Beer", Rept. Res. Lab. Kirin Brewery Co., Ltd., No. 19, 9-16, 1976.
Fritsch et al., "Alpha-Acids Do Not Contribute Bitterness to Lager Beer", Department of Food Science and Technology, Oregon State University, Corvallis, J. Am. Soc. Brew. Chem. 65(1):26-28, 2007.
Smith et al., "Natural Foam Stabilizing and Bittering Compounds Derived from Hops", J. Am. Soc. Brew. Chem. 56(2): 52-57, 1998.
Bamforth et al., "Aspects of foam lacing", EBC Congress 1983, Lecture No. 35, Brewing Research Foundtation, pp. 331-338.
Kunimune et al., "Foam-Stabilizing Effects and Cling Formation Patters of Iso-α-acids and Reduced Iso-α-acids in Lager Beer", J. Agric. Food Chem. 2008, 56, 8629-8634.
Laws et al., "Origin and Estimation of the Gushing Potential of Isomerized Hop Extracts," J. Inst. Brew, vol. 78, pp. 302-308 (1972).
Forster et al., "Breakdown of Hop Bitter Substances during Storage of Beer", Brauwelt International Technical Feature, vol. 22, No. 6, 2004, p. 426.
International Preliminary Report on Patentability issued in corresponding application No. PCT/US2011/037780, dated Nov. 27, 2012 (7 pgs).
Extended European Search Report issued in application No. 11787268.9, dated Oct. 28, 2015 (7 pgs).

* cited by examiner

*Primary Examiner* — Jill Warden
*Assistant Examiner* — Subbalakshmi Prakash
(74) *Attorney, Agent, or Firm* — Hayes Soloway P.C.

(57) ABSTRACT

This invention describes natural hop products that are stable solutions of alpha-acids, as well as their preparation and their use for post-fermentation addition to beer for the purpose of improving the foam quality, as measured by foam stability and foam cling. Improvements in the stability (both physical and chemical) of the alpha-acids are described by incorporation of iso-alpha-acids and tetrahydroiso-alpha-acids as well as various brewery-acceptable co-solvents. The alpha-acids also improve the physical stability of the reduced iso-alpha-acids, including tetrahydroiso-alpha-acids.

6 Claims, No Drawings

NATURAL AND STABLE SOLUTIONS OF ALPHA-ACIDS AND THEIR USE FOR THE IMPROVEMENT OF FOAM QUALITY OF BEER

CROSS REFERENCE TO RELATED APPLICATIONS

This application claims priority from U.S. provisional application Ser. No. 61/347,772, filed May 24, 2010.

BACKGROUND OF THE INVENTION

The quality and behavior of beer foam are essential characteristics of the visual appearance of beer, which has an influence on the consumer behavior. Foam quality is mainly determined by its stability, which is a standard quality control parameter in most breweries. Another foam quality sometimes tested, though more difficult to quantitatively determine, is that of the cling or lacing, which is the foam that attaches to the wall of glass container after the foam collapses. Other criteria which mark the quality are color, bubble size and variation of bubble size, taste as well as how the foam collapses over time. It is advantageous to have a more stable head of foam on a beer after being poured into a glass container; this characteristic is referred to as the foam stability, similarly advantageous to have more foam cling (or lacing). For many years it has been known that hops improve the foam stability and cling (or lacing) of beer and that it is the isomerized alpha-acids that are the major contributor to the improved foam stability and lacing (L. R. Bishop et al. J. Inst. Brew. 80, 68-80, 1974). Reduced, isomerized hop acids (tetrahydroiso- and hexahydroiso-alpha-acids) have been discovered to improve foam stability and cling (lacing) of beer at lower concentrations than the iso-alpha-acids; this is especially important with the low bitterness lagers in which the low concentrations of the iso-alpha-acids would not allow for a good and stable head of foam. Many brewers would rather use a natural product for their beers (that is formed by a natural process, rather than by catalytic hydrogenation), however except for the hop pectins, most other foam-stabilizing hop compounds are not naturally formed in hop products, nor formed by a natural process. A partially hydrogenated or dihydro-alpha-acids has been reported to form naturally in hop products and its isomerized product has been shown to improve foam stability and lacing (R. J. Smith, D. Davidson, and R. J. H. Wilson J. Am. Soc. Brew. Chem. 56, 52-57, 1998). Another disadvantage of using the tetrahydroiso-alpha-acids is that some brewers do not like the "unnatural", almost "hockey-puck" appearance of the foam after collapse, There has been a report that the alpha-acids improve the beer head formation similar to that of the iso-alpha-acids, though the lowest concentration tested was about 26 ppm (K. Asano and N. Hashimato in Rept. Res. Lab. Kirin Brewery Co., Ltd., No. 19, 9-16, 1976) and it did not address whether the alpha-acids improve foam stability of beer. There has also been one report to state that the alpha-acids are equally as effective as the iso-alpha-acids in improving the lacing (or cling) of beer, though no quantitative results were provided (C. W. Banforth and G. Jackson in European Brewery Convention, Proceedings of the 19th Congress 1983, 331-338).

Alpha-acids, in the form of hops, hop pellets, and various extracts have for many years been added to the kettle boil to transform, or isomerize, the low bittering, alpha-acids to strongly bitter, iso-alpha-acids (even though these compounds are isomers, they have quite different chemical properties due to structural differences between the molecules). Because of the slow isomerization of the alpha-acids at the pH of aqueous malt extract during the kettle boil, some of the alpha-acids remain after the boil. Most of the residual alpha-acids are subsequently removed from suspension by binding to the yeast during fermentation and the accompanying drop in pH as well as decrease in temperature during lagering which further reduces the solubility of the alpha-acids such that most commercial, lager beers have quite low concentrations of alpha-acids of less than 1 ppm. In order to have a reasonably good utilization of the alpha-acids in beer, the alpha-acids need to be added after most of the yeast has been removed (referred to as post-fermentation). Some commercial samples of ales can have concentrations of alpha-acids in the range of 2-8 ppm. These relatively high concentrations of alpha-acids are due to addition of hops or hop pellets either late in the kettle boil, in the whirlpool, or after fermentation by a process known as dry hopping. The reason for the addition of these hop products have been to add hop oils and hoppy aroma/flavor to ales and has been quite popular with many of the craft brewers. There has been no evidence to suggest that these higher concentrations of alpha-acids result in improved foam stability or cling (or lacing).

We have discovered that stable solutions of purified and completely natural alpha-acids (in which most of the beta-acids, hop oils and waxes/fats have been removed) can be added to beer after fermentation, with good utilization, and without changing the bittering or flavor profile of the beer, so as to improve the foam quality (including stability and lacing or cling) of beer and that the alpha-acids are more effective than the iso-alpha-acids at improving the foam stability and lacing of the beer and are only slightly less active than the unnatural, hydrogenated iso-alpha-acids. Another advantage of using the alpha-acids is that foam appears to be more "natural-looking" than the beer foam with tetrahydroiso-alpha-acids. Another advantage of the alpha-acids is that they are not bitter (at least to a concentration of 14 ppm in beer, A. Fritsch and T. H. Shellhammer J. Am. Soc. Brew. Chem. 65, 26-28, 2007), so foam stability of beer can be improved without changing the bittering and flavor profile of the beer. In this invention we also describe hop products consisting of solutions of alpha-acids, as well as solutions of alpha-acids which have another hop acid and/or co-solvent which further improves the physical and/or chemical stability of the hop product. We also describe processes for making these hop products.

SUMMARY OF THE INVENTION

Most of the isomerized hop products for post-fermentation addition to beer are sold as aqueous, potassium salts in the pH range of 8-11. For instance the isomerized alpha-acids need the pH to be in the range of about 8.5-9.5 which is at least 5 pH units above the pK of about 3 of these hop acids. At higher pH's the iso-alpha acids are unstable and are degraded to humulinic acids and at lower pH's the iso-alpha-acids tend to come out of solution and form a resinous layer. However the alpha-acids are less acidic than the iso-α-acids (pK of about 5) and thus a higher pH is needed to have all of the alpha-acids to be in the water-soluble, alkaline salt form. Since the alpha-acids readily isomerizes when heated in water with alkali (this is how isomerized hop products are made commercially), any aqueous alpha-acids product would not be expected to be stable and would form the iso-alpha-acids which are bitter and have poorer foam-stabilizing/cling (or lacing) properties than either the hydrogenated, isomerized hop acids (T. Kunimune and T. H. Shellhammer in J. Agric. Food Chem. 56, 8629-8634, 2008) or, as we report in this patent, than the alpha-acids. We have discovered that the purified alpha-acids in the potassium or sodium salt forms are quite soluble in water and that physically stable and chemically stable (at appropriate storage temperatures), aqueous solutions can be made at a pH of about 8.3-9.2 (pH of the product without dilution) which is quite similar to the pH of hop products of iso-alpha-acids. Guzinski and Stegink (U.S. Pat. No. 5,200,227) teaches that stable aqueous solutions of reduced and isomerized alpha-acids can be prepared by mixing of two different kinds of iso-alpha-acids; however they do not say anything about the less acidic (higher pK's) alpha-acids. Gauthier in U.S. Pat. No. 5,965,777 describes aqueous solutions of purified alpha-acids with concentrations as high as 30% could be made, though only to be used to form tetrahydroiso-alpha-acids and no indication was given in terms of its long-term stability as a product itself. We have discovered that the potassium or sodium salts of the purified alpha-acids do not need a second iso-alpha-acid to help solubilize the alpha-acids and that the long-term physical stability of aqueous solutions of alpha-acids is improved by having concentrations of alpha-acids greater than 10% and preferably at least 20%. Physically and chemically stable aqueous solutions of the alpha-acids have been prepared as high as 55%. Concentrations of alpha-acids of greater than about 30% can be used with the advantage of lower shipping costs and container costs, though at a disadvantage of either requiring dilution with water or requiring careful and slow dosing into beer. The physically and chemically stable solutions of the alpha-acids are readily made by mixing the warm and flowable, free acid form of the purified alpha-acids with water followed by addition of an alkali, preferably potassium hydroxide or potassium carbonate (although sodium hydroxide or sodium carbonate also may be used), to bring the pH in the range of about 8.3-9.2 (as-is, or pH of about 7.7 to 8.5 when diluted to 2% alpha-acids). Solutions of alpha-acids of lower pH values are not as stable due to precipitation of alpha-acids and at higher pH the solutions are unstable due to formation of iso-alpha-acids. We have discovered that concentrations of the potassium salt of the alpha-acids in the range of 20-55% in water are physically stable when stored at room temperature or refrigerated, however for long-term chemical stability this product requires refrigeration because the alpha-acids slowly isomerizes at temperatures above about 20° C. and markedly at about 50° C.; such temperatures can be obtained upon transport under non-refrigerated shipment. Refrigeration temperatures need be only as low as about 10° C. for adequate, long-term physical and chemical stability of the alpha-acids.

In another aspect of this invention we describe how addition of relatively low concentrations of a brewer-acceptable, and water-miscible co-solvent such as ethanol, propylene glycol or glycerol (as well as compounds of yeast fermentation such as higher alcohols or fusel alcohols such as amyl alcohol or isoamyl alcohol or isopropyl alcohol) can be added to aqueous solution of the alpha-acids to improve its chemical stability by decreasing the isomerization of the alpha-acids. The potassium salt of the alpha-acids in water with about 10-30 weight % of co-solvent dramatically improves the chemical stability of the alpha-acids.

Since the alpha-acids are not bitter and brewers usually add bitter hop acids post-fermentation, inclusion of an isomerized alpha-acid to the alpha-acids to make an aqueous, potassium salt containing both alpha-acids and iso-alpha-acids would also be an acceptable product for the brewer. In another aspect of this patent, iso-alpha-acids added to the alpha-acids in water and in the potassium salt form improves the physical and chemical stability of the alpha-acids. The inclusion of iso-alpha-acids allows for the use of lower concentrations of alpha-acids that would otherwise form a precipitate upon extended storage. The chemical stability of aqueous solutions of the alpha-acids was found to be correlated with the ratio of iso-alpha-acids to alpha-acids (+iso-alpha-acids). For instance, inclusion of 20% iso-alpha-acids to aqueous solutions of about 10% alpha-acids had about a three fold improvement in the chemical stability of the alpha-acids. The chemical stability of the alpha-acids in an aqueous solution can be further improved by addition of a co-solvent (such as ethanol, propylene glycol, glycerol, or higher alcohols) along with the iso-alpha-acids.

Stable, aqueous solutions of iso-alpha-acids, sometimes referred to as iso-extracts, have been used by brewers to add bitterness to their beer. In another aspect of this invention, an iso-extract can be made with quite wide range of concentrations of alpha-acids (from 2% to about 50%) such that when added to increase the bitterness of beer would also have the additional benefit of improving the foam stability and cling (or lacing) of the beer. Another advantage of having alpha-acids with the iso-alpha-acids is protection of the iso-extract from causing any gushing in beer. Occasionally iso-extracts have been known to cause gushing in beer and inclusion of alpha-acids is known to inhibit gushing of beer. (D. R. J. Laws and J. D. McGuinness in J. Inst. Brew. 78, 302-308, 1972).

In another aspect of this invention, inclusion of tetrahydroiso-alpha-acids with alpha-acids, both as the potassium salt in water, improves the chemical stability of the alpha-acids by decreasing the isomerization of the alpha-acids. Quite unexpectedly we have discovered that the alpha-acids improve the physical stability of the reduced iso-alpha-acids (including tetrahydroiso-alpha-acids, hexnhydroiso-alpha-acids and dihydroiso-alpha-acids) by preventing the precipitate that often occurs upon chilling of these products. Guzinski et al in U.S. Pat. No. 5,200,227 states that single-phase stable solutions of tetrahydroiso-alpha-acids can be made by inclusion of iso-alpha-acids (as well as other reduced iso-alpha-acids). An example of this patent states that the preferred concentrations are 13% tetrahydroiso-alpha-acids+17% iso-alpha-acids. However, we have found that addition of iso-alpha-acids greatly increases the loss of tetrahydroiso-alpha-acids into a resinous phase upon chilling. We have found that inclusion of as little as 3% alpha-acids can prevent the chill precipitate of a 10% solution of tetrahydroiso-alpha-acids. Also, that higher concentrations of alpha-acids allow for stable solutions of tetrahydroiso-alpha-acids as high as 20% (with 20% alpha-acids) without any chill precipitate and do not form any resin even after freezing and thawing, which can happen upon transport during winter months. Also, the inclusion of alpha-acids to aqueous solutions of tetrahydroiso-alpha-acids prevents the formation of crystals of predominantly cis-tetrahydroiso-humulone (adhumulone) that can occur when hop varieties of low cohumulone ratio (such as Zeus, Tomahawk, Columbus, Apollo, Nugget) are used to make the tetrahydroiso-alpha-acids and thus allowing the use of these high alpha-acids varieties of hops.

Processes for the aqueous extraction of alpha-acids from $CO_2$ extract of hops have been described (Todd U.S. Pat. No. 4,647,464 and Cowles U.S. Pat. No. 4,590,296), as well as the preparation of a free acid, resin form of the alpha-acids in which most of the beta-acids have been removed (Wilson and Smith in example 5 of PCT WO93/02177 and M. Smith PCT WO 2000/068356). Basically, as further described in this patent, the $CO_2$ extract of hops is mixed with water and an alkali to bring the pH high enough to dissolve most of the alpha-acids, the aqueous alpha-acids is removed, and then the pH is further reduced to remove most of the dissolved beta-acids and finally the pH is dropped to about 2 to acidify all of the alpha-acids. M. Smith in WO 2000/068356 states that the purified, free acid form of the alpha-acids is unstable and requires refrigeration. In another aspect of this patent, solutions of the free acid of the alpha-acids with a brewery-acceptable solvent such as propylene glycol, ethanol or combinations thereof, as well as ethyl acetate and higher alcohols such as amyl alcohol or iso-amyl alcohol not only forms a physically stable solution, but also forms a chemically stable solution in the range of concentration of alpha-acids from about 10% to more than 50% and do not require refrigeration; (losing about 2% of the alpha-acids after 6 months at room temperature with propylene glycol as the solvent). Solutions of the free acid form of the alpha-acids also have the advantage of being rather stable upon storage at elevated temperatures due to lack of formation of the iso-alpha-acids. Also, addition of a co-solvent such as a higher alcohol or ethyl acetate to a propylene glycol solution of alpha-acids results in further improvement in chemical stability of the alpha-acids Physically and chemically stable solutions of the alkaline form of the alpha-acids are also possible using a solvent such as ethanol, propylene glycol, glycerol, ethyl acetate or higher alcohols such as amyl alcohol and isoamyl alcohol. The stability of the potassium salt and the free acid form of the alpha-acids are quite similar in propylene glycol, as long as the temperature does not get above about 20° C. for extended period of time. The free acid form is more stable at higher temperatures and would be preferred if the product is exposed to higher temperatures, as can occur during transport. Because of the relatively high cost of the aforementioned solvents, higher concentrations of alpha-acids of 30-45% are preferred; also less of the solvents would be dosed into the beer. The addition of some water to these solutions of potassium or sodium salts of the alpha-acids is also possible without much effect on the chemical and physical stability of the alpha-acids with the added benefit, at least in the case of propylene glycol and glycerol, of lower viscosity.

Another aspect of this invention is that of post-fermentation addition of solutions of alpha-acids to improve the foam quality (including the foam stability and cling or lacing) of beer. These inventions demonstrates that alpha-acids improve the foam stability of beer in a dose-dependent manner in beer and that the alpha-acids are significantly more effective than the iso-alpha-acids in improving both the foam stability and cling or lacing of beer. Also, the alpha-acids improve the foam stability and foam cling (or lacing) of beer at concentrations similar to that of the unnatural, reduced and isomerized alpha-acids. Concentrations of alpha-acids as low as 1 ppm can, in some beers, cause a marked improvement in the foam stability. For most beers, concentrations above about 10 ppm in lager beers do not have much further effect on foam stability due to the low solubility of alpha-acids in cold, lager beer. For the best utilization of the alpha-acids to beer, solutions of the alkaline form of the alpha-acids are preferred over that of the free acid form. For most brewers the preferred solvent would be water and no difference in utilization was found between 10% alpha-acids, as the potassium salt, in water versus propylene glycol. If refrigeration is unavailable, the brewer may advantageously desire that the alpha-acids product have one of the aforementioned co-solvents in water, a co-solvent such as ethyl alcohol, propylene glycol, glycerol, higher alcohols (such as amyl alcohol or iso-amyl alcohol), or other brewer acceptable solvents, so that the product can be stored for a longer time with less loss of the alpha-acids. The brewer might also desire to have the aqueous solution of non-bitter alpha-acids with bittering hop acids such as iso-alpha-acids or tetrahydroiso-alpha-acids in order to provide improved foam stability/cling (or lacing) along with some bitterness; with the added benefit of improved stability of the alpha-acids as well as improved physical stability of the tetrahydroiso-alpha-acids. For even longer shelf life the brewer might desire an aqueous solution of the potassium salt of the alpha-acids with iso-alpha-acids and a co-solvent, though too high concentrations of iso-alpha-acids and co-solvent can result in phase separation upon exposure to cold temperatures. For best utilization of the alpha-acids it is best to pump the solution of alpha-acids into a stream of beer after primary filtration so that most of yeast is not available to bind the alpha-acids.

Even though this invention has demonstrated that the alpha-acids improve the foam stability and cling (or lacing) of beer, it is known that the alpha-acids are not stable in beer, loosing about 55% of the alpha-acids after storage at room temperature for 8 months (A. Forster, S Massinger, and R. Schmidt in Brauwelt International 22, 426, 2004) or about 50% of the alpha-acids were lost in only 20 days at 40° C. (B. Jaskula et. al. in J. Am. Soc. Brew. Chem. 65, 38-46, 2007). Because of this known poor stability of the alpha-acids in beer, even if there was a commercially available solution of alpha-acids, the brewer probably would not want to use it as a foam stabilizer in beer; though one might want to use it for its anti-free radical properties (as noted by P. L. Ting in J. Am. Soc. Brew. Chem. 66, 116-126, 2008) and potentially improved flavor stability. However, another unexpected aspect of this patent is that even though the concentration of alpha-acids definitely decreases rather rapidly upon storage of beer at room temperature or higher, the improvement in foam stability of the beer with added alpha-acids does not significantly change upon storage.

DETAILED DESCRIPTION OF THE INVENTION

Example 1

Preparation of Free Acid Form of Alpha-Acids and Stable Solutions in Propylene Glycol This example demonstrates the basic process for making a free acid form of alpha-acids, as well as the ease of preparation of solutions of alpha-acids in a solvent such as propylene glycol and its good physical and chemical stability.

Example 1a. Preparation of Free Acid Resin of Alpha-Acid

To 323.9 g of $CO_2$ extract of hops (56.3% alpha-acids by HPLC) was added 1620 g of deionized water, warmed to 53° C. and with mixing 48.5 ml of 45% potassium hydroxide was added; pH was 8.49 at 56° C. After settling for 1 hour in a separatory funnel in a 54° C. oven, the lower aqueous phase containing most of the alpha-acids was transferred to a beaker. To 117.7 g of the upper resin phase was added 972 g of deionized water and 1.0 ml of 45% KOH was added to bring the pH to 8.51 at 53° C. After settling for 1 hour in a separatory funnel in a 55° C., this second, lower aqueous phase (containing most of the residual alpha-acids) was combined with the first aqueous phase. The 107.4 g of resin phase had only 0.8% of the initial alpha-acids. To the combined aqueous phases was added 1.0 ml of 50% sulfuric acid to drop the pH to 8.14 and after settling for 1 hour in an oven at 55° C., 6.2 g of lower resin phase was removed. The remaining aqueous phase was warmed to 57° C. and 67 ml of 50% sulfuric acid was added to bring the pH to about 1.7 (Merck pH strip) and then allowed to settle for 1.5 hours in a separatory funnel in a 60-65° C. oven. 202.1 g of lower, alpha-acids resin was obtained at an overall recovery of alpha-acids of 97.5%. The hplc concentration of alpha-acids was 88.0%.

Example 1b. Preparation of Solutions of the Free Acid Form of Alpha-Acids in Propylene Glycol To make 20% alpha-acids in propylene glycol, 13.44 g of propylene glycol (FCC grade) was added to 3.98 g alpha-acids resin of Example 1a. With mixing and warming to about 50° C., all of the alpha-acids dissolved. The yellow-colored, alpha-acids solution remained transparent even upon refrigeration. To make 30% alpha-acids in propylene glycol, 13.54 g of propylene glycol (FCC grade) was added to 7.006 g of alpha-acids resin of Example 1a. Upon mixing and warming to about 50° C., all of the alpha-acids were dissolved to form a transparent, yellow-colored solution that remained transparent even upon refrigeration.

Example 1c. Stability of the Free Acid Form of Alpha-Acids in Propylene Glycol This example demonstrates that alpha-acids have good physical and chemical stability in propylene glycol. Samples of Example 1b were stored for 6 months in freezer or at room temperature. The freezer and room temperature samples did not have any visible precipitate. There was only a 2% decrease in concentration of alpha-acids (relative to the freezer samples) as shown in Table 1.

TABLE 1

HPLC analyses of samples of α-acids in propylene glycol after 6 months storage glass vials and in freezer or at room temperature (about 20-24° C.).

| Sample | Storage Temp. | % Loss of α-acids | % α-acids | % Iso-α-acids |
|---|---|---|---|---|
| 30% α-acids in propylene glycol | Freezer | — | 29.6 | 0.6 |
|  | Ambient | 2.0 | 29.0 | 0.4 |
| 20% α-acids in propylene glycol | Freezer | — | 19.8 | 0.3 |
|  | Ambient | 2.0 | 19.4 | 0.25 |

Example 2

Co-Solvents can Improve the Stability of Free Acid Form of Alpha-Acids in Propylene Glycol To 225.0 g of free acid form of alpha-acids (84.1% alpha-acids by HPLC) was added 132.0 g of propylene glycol (USP grade) and mixed while being warmed on a hot plate. When the temperature reached 41° C., all of the resin was dissolved. The concentration of alpha-acids was 54% by HPLC. To aliquots of this stock solution were added co-solvents to make solutions with 45% alpha-acids and 15.5 weight percent co-solvent. Samples were stored in either 1 oz. PETG bottles (glycol-modified, polyethylene terephthalate) at room temperature or in glass vials in a freezer for 6 months and then analyzed by HPLC.

The co-solvents ethyl acetate and iso-amyl alcohol, but not ethanol, further improved the stability of the free acid form of alpha-acids in propylene glycol as shown in Table 2.

TABLE 2

Effect of co-solvents on the stability of the free acid form of alpha-acids in propylene glycol stored in 1 oz. PETG bottles at room temperature (about 20-22° C.) for 6 months.

| Co-solvent | *% Loss of Alpha-acids | % Alpha-acids | % Iso-alpha-acids |
|---|---|---|---|
| None | 2.0 | 44.1 | 0.45 |
| Ethyl acetate | 1.4 | 44.4 | 0.50 |
| Iso-amyl alcohol | 1.4 | 44.4 | 0.48 |
| Ethanol | 2.0 | 44.1 | 0.50 |

*Loss of alpha-acids from solutions stored in freezer.

Example 3

Potassium Salt of Alpha-Acids in Propylene Glycol and Glycerol Preparation and Stability To 36.3 g of free acid form of alpha-acids (89.1% alpha-acids by HPLC) was added 271.7 g of propylene glycol and all of the alpha-acids were dissolved upon warming and mixing. The concentration of alpha-acids was 10.5%. To stirred aliquots of this stock solution were added 45% potassium hydroxide (at room temperature) or potassium carbonate (required 53° C. to dissolve the potassium carbonate) such that more than one equivalent of potassium is added since lower equivalents were found to be not as stable. For the alpha-acids in glycerol, alpha-acids resin (89.1% alpha-acids by HPLC) and glycerine were mixed at 53-55° C. and 45% KOH or potassium carbonate were added; mixing was continued until all of the resin (or potassium carbonate) was dissolved. Aliquots of each sample were put in glass vials and stored at either 40° C. or at room temperature for stability tests.

Alpha-acids stored at room temperature for 9 months were similarly stable in propylene glycol whether in the free acid form or the potassium salt form, as long as the pH was in the range of 7.6 to 8.6, at 2% alpha-acids, as shown in Table 3. If the pH is too high, in the region of 9 (at 2% alpha-acids), the alpha-acids in propylene glycol are quite unstable, forming mostly iso-alpha-acids. At elevated temperature of 40° C. the free acid form of the alpha-acids was more stable than the potassium salt form in propylene glycol due to the formation of the iso-alpha-acids at elevated temperatures. The potassium salt of the alpha-acids had relatively good stability in glycerin, especially if stored at about 20° C.

TABLE 3

Stability of solutions of alpha-acids (10-20%) in propylene glycol and glycerin after 9 months at room temperature and after 5 weeks at 40° C.

| Solvent | Alkali | pH at 2% Alpha-acids | % Loss of Alpha-acids (average) | |
|---|---|---|---|---|
| | | | 20° C. for 9 months | 40° C. for 5 weeks |
| Propylene glycol | None | 3.3-3.5 | 3.0, 4.9 (3.9) | 2.4, 3.0 (2.8) |
| Propylene glycol | 45% KOH | 7.6-8.6 | 3.6-4.6 (4.0) | 4.6-5.3 (4.9) |
| Propylene glycol | Potassium carbonate | 7.4-8.2 | 3.6-7.6 (5.3) | 3.5-7.1 (5.4) |
| Propylene glycol | Potassium carbonate | 9.1 | 25.5 | 47.5 |
| Glycerin | 45% KOH | 8.2 | 3.4 | 6.2 |
| Glycerin | Potassium carbonate | 7.9-8.4 | 3.1-4.1 (3.5) | 5.4-7.1 (6.5) |

Example 4

Preparation and Stability of Alpha-Acids in Water

This example demonstrates that aqueous solutions are physically more stable at higher concentrations of alpha-acids and that co-solvent such as propylene glycol can also improve stability.

The samples made in water were prepared as follows: 23.9 g of alpha-acids free acid resin (89.2% alpha-acids, 1.2% beta-acids and 1.0% iso-alpha-acids) was warmed to 55° C. and 15.4 g of reverse osmosis water was added and then 45% potassium hydroxide was added with mixing; the maximum temperature was 60° C. and the sample was quickly cooled to prevent isomerization of the alpha-acids. A total of 7.9 g of 45% KOH was require to bring the pH to 8.45 (when diluted to 2% alpha-acids). This sample had a concentration of alpha-acids of 46.3% and was transparent (brown-amber in color) upon cooling to room temperature. To aliquots of this stock solution were added varying amounts of reverse osmosis water to make samples of concentration of alpha-acids in the range of 10-45%. The three samples with added propylene glycol were prepared by making 33.0% alpha-acids in water at a pH of 8.3 (at 2% alpha-acids) and then aliquots were diluted with water and propylene glycol. Samples were stored in glass vials at room temperature.

Samples with concentrations of alpha-acids in water in the range of 20-45% had no precipitate after storage for 3 months as shown in Table 4. In fact they did not have any precipitate even after storage for 6 months at room temperature, followed by overnight refrigeration. A 3 month storage solution of alpha-acids of 10% had a resinous precipitate at room temperature and required addition of some co-solvent such as propylene glycol to maintain long-term physical stability.

TABLE 4

Effect of concentration of alpha-acids on the physical stability of aqueous solutions of alpha-acids stored at room temperature for 3 months.

| Concentration of alpha-acids | Wt % PG | pH (at 2% α-acids) | Physical Stability after 3 months | |
|---|---|---|---|---|
| | | | Room temp. | *Refrigerated |
| 45% | 0 | 8.45 | Transparent | Transparent |
| 30% | 0 | 8.45 | Transparent | Transparent |
| 20% | 0 | 8.45 | Transparent | Transparent |
| 15% | 0 | 8.45 | Transparent | Thin layer of resin |
| 10% | 0 | 8.45 | Layer of resin | Layer of resin |
| 15% | 15 | 8.28 | Transparent | Transparent |
| 10% | 15 | 8.28 | Transparent | Precipitate, no resin |
| 10% | 30 | 8.28 | Transparent | Transparent |

*The room temperature samples were stored overnight in a refrigerator.

Example 5

Improvement in Stability of Alpha-Acids in Water with a Co-Solvent

To 290.7 g of alpha-acids free acid (84.2% alpha-acids, 2.2% beta-acids) was added 291 g of reverse osmosis water at 54° C. and with mixing at 500 rpm, 94.6 g of 45% (w/w) potassium hydroxide was added and the temperature was kept below 51° C.; the pH was 8.9 (measured as-is at 26° C.); the concentrations of alpha-acids and iso-alpha-acids were 36.3% and 0.5%, respectively. To aliquots of this stock solution were added water and/or 95% ethanol (Everclear) or propylene glycol such that the concentration of alpha-acids was 20%. Samples were stored in 1 oz, PETG bottles and analyzed by HPLC.

The aqueous solution of 20% α-acids in water had poor chemical stability when stored at room temperature due to formation of the iso-alpha-acids as shown in Table 5. For such a product refrigeration is needed, though only down to about 10° C. since at this temperature there was only a 1% loss of alpha-acids after 6 months; though lower temperatures would result in even lower losses of alpha-acids. This result demonstrates how sensitive the isomerization of the potassium salt of alpha-acids is to temperature. Relatively low concentrations of the co-solvents ethanol and propylene glycol dramatically improved the chemical stability of the potassium salt of the alpha-acids in water by decreasing the formation of the iso-alpha-acids. The co-solvents also prevented the formation of beta-acids crystals that formed in this particular batch of 20% alpha-acids. Concentrations of alpha-acids of greater than 30% also prevented the formation of crystals of beta-acids; further demonstrating the improved physical stability of aqueous solutions of alpha-acids with increasing concentration.

TABLE 5

Effect of a co-solvent on the stability of aqueous solutions of 20% Alpha-acids stored in 1 oz. PETG bottles for 6 months at about −3° C., about 10° C. or at room temperature (about 20-22° C.).

| Co-Solvent | Wt % Co-Solvent | Storage Temp. | % Loss of Alpha-acids | *% Increase in % Iso-Alpha |
|---|---|---|---|---|
| None | 0 | 10° C. | 1.3 | 0.5 |
| None | 0 | 20-22° C. | 9.1 | 7.9 |
| Ethanol | 10 | 20-22° C. | 4.1 | 4.3 |
| Ethanol | 15 | 10° C. | 0.8 | 0.3 |
| Ethanol | 15 | 20-22° C. | 3.4 | 3.2 |
| Ethanol | 25 | 20-22° C. | 1.3 | 2.1 |
| Propylene Glycol | 15 | 20-22° C. | 5.0 | 4.5 |
| Propylene Glycol | 30 | 20-22° C. | 2.3 | 2.6 |

*100 × (Increase in % Iso-alpha-acids)/% Alpha-acids (at −3° C.)

Example 6

Improvement in Stability of Alpha-Acids with Iso-Alpha-Acids

The 20-30% solutions of alpha-acids were prepared as described in Example 5, though using a free acid form of alpha-acids with 87.7% alpha-acids (+0.5% beta-acids). The solutions of alpha-acids with iso-alpha-acids were prepared by blending the free acid forms of the alpha-acids and the iso-alpha-acids (typically about 88-90% iso-alpha-acids) and mixing with reverse osmosis water in a water bath at about 50° C., followed by addition of 45% potassium hydroxide to bring the pH to 8.9 (as-is at 23-26° C.).

The stability of the alpha-acids was improved with increasing concentrations of iso-alpha-acids or increasing ratio of iso-alpha-acids to (alpha-acids+iso-alpha-acids) such that inclusion of about 13 weight % of iso-alpha-acids caused a 50% improvement in the stability of the alpha-acids as shown in Table 6. The improved stability was due to a decrease in the formation of iso-alpha-acids. The iso-alpha-acids also improved the physical stability of the alpha-acids. The sample of 10% alpha-acids solution with 20% iso-alpha-acids stored at room temperature did not have any chill precipitate, while a similarly stored solution of 10% alpha-acids had chill resin.

TABLE 6

Effect of iso-alpha-acids on the stability of alpha-acids, as determined by HPLC, of samples stored at room temperature for 6 months in PETG bottles.

| *Ratio of Iso-alpha-acids | Conc. Of α-acids | Conc. Of Iso-α-acids | % Loss of α-acids | #% Increase in % Iso-α |
|---|---|---|---|---|
| 0.024 | 20.1 | 0.5 | 10.1 | 9.1 |
| 0.026 | 29.9% | 0.8% | 10.4 | 9.1 |
| 0.332 | 20.1 | 10.0 | 5.3 | 4.9 |
| 0.402 | 18.0 | 12.1 | 5.4 | 3.9 |
| 0.498 | 15.1 | 15.0 | 4.3 | 3.9 |
| 0.662 | 10.2 | 20.0 | 3.1 | 3.6 |

All of the 6-month storage samples were transparent after standing overnight in a 0-1° C. refrigerator.
*Ratio of iso-alpha-acids = % Iso-alpha-acids/(% alpha-acids + % Iso-alpha-acids)
100 × (Increase in % Iso-alpha-acids)/% Alpha-acids (at −3° C.)

Example 7

Co-Solvents Improve the Stability of Alpha-Acids in Solutions Containing Iso-Alpha-Acids This example shows how a co-solvent further improves the stability of alpha-acids in a solution of alpha-acids containing iso-alpha-acids.

To 214.3 g of alpha-acids and 205.7 g of iso-alpha-acids, both in free acid forms, were added 424 g of reverse osmosis water at 45° C. and mixed at 450 rpm. A total of 140.9 g of 45% potassium hydroxide was added to bring the pH to 8.9 (as-is at 23° C.). To aliquots of this stock solution were added co-solvents and water such that the final concentrations of alpha-acids and iso-alpha-acids were 15.0% and 15.3%, respectively by HPLC and stored in 1 oz. PETG bottles for 6 months.

Both the co-solvents ethanol and isopropyl alcohol caused a similar and significant improvement in the stability of the alpha-acids as shown in Table 7. There was a 50% decrease in the loss of alpha-acids with about 9 weight % of ethanol. Nearly all of the loss of alpha-acids was due to the formation of iso-alpha-acids. The sample of 10 wt % ethanol+15% alpha-acids+15% iso-alpha-acids had about 20% of the loss of alpha-acids as solutions of 15-30% alpha-acids in water. Propylene glycol also improved the stability of the alpha-acids, though not as effectively as ethanol.

TABLE 7

Effect of co-solvents on the stability of samples of 15% Alpha-acids + 15% iso-alpha-acids stored in 1 oz. PETG bottles for 6 months at about −3° C. or at room temperature (about 20-22° C.).

| Co-solvent | Wt % Co-solvent | % Loss of α-acids | *% Increase in % Iso-α |
|---|---|---|---|
| None | 0.0 | 4.2 | 4.2 |
| Ethanol | 5 | 3.1 | 3.0 |
| Ethanol | 10 | 1.8 | 1.8 |
| 2-Propanol | 5 | 2.9 | 2.6 |
| Propylene Glycol | 15 | 2.2 | 1.9 |

*100 × (Increase in % Iso-alpha-acids)/% Alpha-acids (at −3° C.)

Example 8

Improvement of Stability of Alpha-Acids with Tetrahydroiso-Alpha-Acids

To free acid form of alpha-acids were added the free acids of either iso-alpha-acids, tetrahydroiso-alpha-acids or hexahydroiso-alpha-acids and mixed with water and 45% potassium hydroxide to bring the pH to 8.9 (as-is at 24-26° C.); the concentrations of alpha-acids and iso-alpha-acids or reduced iso-alpha-acids were all 15% by HPLC. Samples were stored in 1 oz PETG bottles for 6 months at either—3° C. or at room temperature (20-22° C.).

This example shows that not only the iso-alpha-acids but also tetrahydroiso-alpha-acids, but not hexahydroiso-alpha-acids, improves the chemical stability of alpha-acids by decreasing the formation of iso-alpha-acids; see results in Table 8.

TABLE 8

Effect of hop acids, at 15%, on the stability of aqueous solutions of 15% alpha-acids stored at room temperature for 6 months in PETG bottles.

| Type of Hop acid | *% Loss of Humulone | #% Increase in % Iso-α |
|---|---|---|
| None, 30% alpha-acids | 7.6 | 7.6 |
| Iso-alpha-acids | 4.1 | 3.8 |
| Tetrahydroiso-alpha-acids | 5.0 | 5.0 |
| Hexahydroiso-alpha-acids | 7.1 | 6.1 |

*The alpha-acids humulone (+adhumulone) were only quantified because cohumulone co-eluted with some of the HPLC peaks of the reduced iso-alpha-acids.
100 × (Increase in % Iso-alpha-acids)/% Alpha-acids (initial values)

Example 9

Improvement in the Physical Stability of Tetrahydroiso-Alpha-Acids with Alpha-Acids Aqueous solutions of tetrahydroiso-alpha-acids are commercially sold at concentrations of 9-10% by HPLC. Though initially the solutions do not contain precipitate, over time upon storage at ambient temperatures and with subsequent refrigeration, a chill precipitate may form (due to a drop in pH upon storage), resulting in loss of tetrahydroiso-alpha-acids in a resin at the bottom of the container. Also with tetrahydroiso-alpha-acids made from certain hop varieties with low cohumulone content (such as Nugget, Zeus and Apollo), crystals can form that consist mostly of the cis-form of tetrahydroisohumulone (+adhumulone). Either of these two solids requires heating and shaking of the container to redissolve. Thus it is advantageous for the brewer never to have either of these solids occur during the shelf life of the solution of tetrahydroiso-alpha-acids.

In the absence of any alpha-acids, cis-tetrahydroiso-alpha-acids crystals formed during a 6 months storage at room temperature of a 9% tetrahydroiso-alpha-acids solution made from the variety Apollo via the solvent-free process of Wilson and Smith (US 2008 0160146 A1). After cooling in a refrigerator to about 0° C., there was nearly a total loss of 10% of the initial tetrahydroiso-alpha-acids in a chill precipitate and the crystals; see Table 9. By comparison, inclusion of 10% alpha-acids with the 10% tetrahydroiso-alpha-acids resulted in a physically stable product in which there were no crystals and almost no loss of tetrahydroiso-alpha-acids upon chilling to 0° C. If stored for 6 months at about 10° C., there was almost no loss of alpha-acids and there were no solids formed upon cooling to 0° C.

TABLE 9

Storage stability of solutions of tetrahydroiso-alpha-acids (from the hop variety Apollo; tetrahydroiso-cohumulone ratio of 0.27) in 1 oz PETG bottles for 6 months.

| % Alpha-acids | % Tetra-hydroiso-alpha-acids | Storage Temp. | * Loss of Humulone | Crystals Formed? | # Loss of Tetra in Solids at 0° C. |
|---|---|---|---|---|---|
| 0 | 9.1 | 20° C. | — | Yes | 9.9 |
| 9.8 | 10.2 | 10° C. | 0.1 | No | 0.0 |
| 9.8 | 10.2 | 20° C. | 4.2 | No | 0.2 |

* The alpha-acids humulone (+adhumulone) were only quantified because cohumulone co-eluted with some of the HPLC peaks of the tetrahydroiso-alpha-acids.
% loss of tetrahydroiso-alpha-acids in both the crystals and the resin that formed upon chilling overnight to about 0° C.

Example 10

Utilization of Alpha-Acids Added to Cold Beer

Cold beer (brand A) was degassed by addition of 8 drops of octanol to four 12 oz bottles of beer, followed by bath sonication. 460 g aliquots were transferred to 600 ml glass beakers, cooled to about 1° C. in a refrigerator and then the 10% (w/w) alpha-acids solutions were added to the stirred (Teflon-lined stirring bar) beer to make a 5 ppm alpha-acids. After a few seconds of mixing, about 10 ml aliquot was filtered through a 0.45µ sintered glass filter (Whatman GMF media) and 5 ml of the filtrate was diluted to 10 ml with acidic methanol (0.5 ml of 85% phosphoric acid in 1 L of methanol); 20µ was injected onto HPLC column.

This example demonstrates that the utilization (% of the initial alpha-acids in solution in cold beer) of the free acid form of the alpha-acids (in propylene glycol) in cold beer was not as good as the potassium salt of the alpha-acids added to beer. The utilization of the potassium salt of alpha-acids in beer was essentially identical whether the solvent was propylene glycol or water.

TABLE 10

HPLC results of filtrate of beer to which about 5-ppm of alpha-acids were added.

| Alpha-acids Product | Utilization of Alpha-acids in cold filtrate | Concentration of alpha-acids added to beer, ppm |
|---|---|---|
| Free acid in propylene glycol | 67 | 4.9 |
| Potassium salt in Propylene glycol | 86 | 4.9 |
| Potassium salt in water | 86 | 5.0 |

Example 11

Alpha-Acids Improves the Foam Stability of Beer in Concentration-Dependent Manner A solution of 10% (w/w) alpha-acids (free acid form in propylene glycol) was prepared as of in Example 1b. This solution was diluted with water and dilute potassium hydroxide was added to bring the pH to 7.2. After chilling, the haze was removed by filtration through a 0.45 µm filter; concentration of alpha-acids was 0.17%. From this stock solution of alpha-acids were prepared various dilutions with water and 1.0 g aliquots were added to 12 oz bottles of beer (Brand A), then foamed to top of each bottle in order to remove most of the air and then capped. The bottles were inverted 10 times during a period of about one hour and then stored for 2 weeks at room temperature. The foam stability of each bottle was determined using a Haffmans foam stability tester model Nibem-T. The foam stability is measured as the time it takes for the layer of foam to collapse 30 mm in a glass container.

Addition of a solution of purified alpha-acids directly into beer resulted in a concentration-dependent increase in the foam stability of beer as demonstrated in Table 11. Even 1 ppm of alpha-acids caused a significant improvement in the foam stability of this beer.

TABLE 11

Foam stability (Nibem-30) of beer (brand A had 6.7 ppm iso-alpha-acids and 0.5 ppm alpha-acids) as affected by alpha-acids.

| Amount of Alpha-acids added in ppm | *Concentration of Alpha-acids in ppm | Nibem-30, seconds (Average ± std. dev.) |
|---|---|---|
| 0 | 0.49 | 184 ± 3 |
| 1.00 | 1.35 | 199 ± 2 |
| 1.99 | 2.17 | 208 ± 3 |
| 2.99 | 3.18 | 214 ± 2 |
| 4.00 | 3.93 | 221 ± 2 |

*Concentration of alpha-acids in beer were determined by HPLC.

Example 12

Alpha-Acids Improve Foam Stability and Foam Cling (or Lacing) Better than Iso-Alpha-Acids To 12 oz bottles of beer (Brand A) were added weighed amounts of aqueous solutions of 0.12% of either iso-α-acids, α-acids or tetrahydroiso-alpha-acids to make 3-ppm of each compound in beer. After fobbing to top and recapping, the bottles were shook at 120 oscillations for 1 hour and then allowed to stand at room temperature for 4 days. The foam stability of each bottle was determined using a Haffmans foam stability tester model Nibem-T. The foam stability is measured as the time it takes for the layer of foam to collapse 30 mm in a glass container. After foaming stability measurements were taken, the foam cling (or lacing) of beer was determined by modification of the method described by Kunimune and Shellhammer in J. Agric. Food Chem. 56, 8629-8634 (2008). Quantification of the amount of cling (or lacing) was done by absorbance at 240 nm in water as described by G. Jackson and C. W. Banforth in J. Inst. Brew. 88, 378-81 (1982). The wavelength of 240 nm was chosen instead of 230 nm because at that wavelength the alpha-acids, iso-alpha-acids, and tetrahydroiso-alpha-acids have nearly equal absorbance in water at pH of 5.4 (the approximate pH of the foam cling in water). The foam cling (or lacing), between top of container to 4 cm below the top, was dissolved in 50 ml of water and was quantified by measuring the absorbance at 240 nm in water.

Alpha-acids caused a significantly greater improvement in the foam stability of beer than iso-alpha-acids, though less than the tetrahydroiso-alpha-acids; see Table 12. Alpha-acids caused a significantly greater amount of foam cling (or lacing) of beer than iso-alpha-acids and similar to that of the tetrahydroiso-alpha-acids.

TABLE 12

Effect of 3 ppm of alpha-acids on foam stability and foam cling (or lacing) of a beer (brand A with 4.6 ppm of iso-alpha-acids); also compared with iso-alpha-acids and tetrahydroiso-alpha-acids. Both measurements were repeated six times for each sample; average ± standard deviation are presented.

| Hop Acid | Foam Stability, seconds | Foam Cling (or Lacing), relative to control |
|---|---|---|
| None added | 181 ± 1 | 100 *(0.056 ± 0.002) |
| Iso-alpha-acids | 197 ± 5 | 121 ± 4 |
| Alpha-acids | 220 ± 3 | 146 ± 9 |
| Tetrahydroiso-alpha-acids | 236 ± 4 | 146 ± 7 |

*Absorbance at 240 nm in water.

Example 13

Alpha-Acids Improve the Foam Stability of a Number of Beers

A solution of potassium salt of alpha-acids in propylene glycol was diluted to 1.3% alpha-acids in water (pH 7.3) and then refrigerated overnight and filtered. To each 12 oz bottle of beer was added 0.843 g of the alpha-acids solution so that the concentration of alpha-acids was 3.0 ppm. Each bottle was foamed to top and capped, shaken 10 times over a period of 1 hour and allowed to stand at room temperature for 2 weeks. The foam stability of each bottle was determined using a Haffmans foam stability tester model Nibem-T.

Alpha-acids improved the foam stability of all five beers tested, though the improvement in foam stability was much better in some beers than in others.

TABLE 13

Improvement in foam stability of various beers in which 3 ppm of alpha-acids was added.

| Brand of Beer | Increase in Foam Stability, seconds | Foam Stability of Control beer (seconds) |
|---|---|---|
| A | 30 | 184 |
| B | 22 | 159 |
| C | 19 | 175 |
| D | 16 | 209 |
| E | 13 | 181 |

Example 14

Loss of Alpha-Acids in Beer does not Affect Foam Stability

To 3.23 g of 10% alpha-acids in propylene glycol were added 1.75 ml of 0.5 Molar aqueous solution of potassium hydroxide and 15.7 g of reverse osmosis water; pH was 7.5. 94 mg aliquots of this stock solution of 1.5% alpha-acids were added to 12 oz bottles of beer (brand A), then foamed to top and recapped and inverted each bottle 7 times. Bottles of beer were stored at room temperature and in the dark and were brought to 20° C. before foam stability testing using Haffmans foam stability tester model Nibem-T. Concentrations of alpha-acids and iso-alpha-acids were determined by HPLC using the international calibration extract, ICE-2 for the alpha-acids and the international calibration standard, ICS-I2 for the iso-alpha-acids.

Even though the concentration of alpha-acids in beer had decreased by 47% after 18 weeks storage at room temperature, there was no decrease in foam stability. The alpha-acids treated beer had a higher concentration of iso-alpha-acids possibly due to some of the alpha-acids having been transformed to the iso-alpha-acids which have less foam-stabilizing activity than the alpha-acids. Some of the lost alpha-acids must have formed compounds that also had good foam stability.

TABLE 13

Foam stability and concentration of alpha-acids of beer with 4-ppm alpha-acids after 18 weeks at room temperature.

| Sample | Storage Time (weeks) | Foam Stability, seconds | Alpha-acids, ppm | Iso-alpha-acids, ppm |
|---|---|---|---|---|
| Control Beer | 0.14 | 174 | 0.3 | 6.1 |
|  | 18 | 171 | <0.2 | 5.3 |
| 4-ppm Alpha-acids | 0.14 | 199 | 4.3 | 6.1 |
|  | 18 | 201 | 2.3 | 5.5 |

We claim:

1. A process for making a stable solution of alpha-acids, which comprises the steps in sequence of:
    a) adding an acid to an aqueous extract of alpha-acids from a carbon dioxide extract of hops in a first acidification step to lower the pH of the aqueous extract to a pH in the range of 7.5 to 8.2, whereby to produce a first resin phase and an aqueous phase;
    b) removing the first resin phase;
    c) adding an acid to the aqueous phase in a second acidification step to further lower the pH of the aqueous phase to form purified alpha-acids in free-acid form in a second resin phase;
    d) isolating the second resin phase; and
    e) mixing or blending the second resin phase with a solvent to form a stable solution containing alpha-acids in free-acid form;
    f) adding an iso-alpha-acid to the solution,
    wherein said solvent reduces the alpha-acids' susceptibility to degradation and/or precipitation upon storage of the solution, and wherein said solution, when added to a malt-based beverage, improves the foam stability of the beverage.

2. The process of claim 1, wherein the solvent is selected from the group consisting of ethanol, propylene glycol, ethyl acetate, a higher alcohol, and a mixture of two or more thereof.

3. The process of claim 1, wherein one or more additional hop acids selected from the group consisting of a tetrahydroiso-alpha-acid, a hexahydroiso-alpha-acid and a dihydroiso-alpha-acid is added to the solution.

4. A process for making a stable solution of alpha-acids, which comprises the steps in sequence of:
    a) adding an acid to an aqueous extract of alpha-acids from a carbon dioxide extract of hops in a first acidification step to lower the pH of the aqueous extract to a pH in the range of 7.5 to 8.2, whereby to produce a first resin phase and an aqueous phase;
    b) removing the first resin phase;
    c) adding an acid to the aqueous phase in a second acidification step to further lower the pH of the aqueous phase to form purified alpha-acids in a second resin phase;
    d) isolating the second resin phase;
    e) mixing or blending the second resin phase with water and a co-solvent;
    f) adding an iso-alpha acid to the solution; and
    g) adding an alkali to raise the pH at least until the alpha-acids are dissolved in alkaline form, thereby forming a stable solution that contains alpha-acids, wherein the solution, when added to a malt-based beverage, improves the foam stability of the beverage.

5. The process of claim 4, wherein the co-solvent is selected from the group consisting of ethanol, propylene glycol, glycerol, a higher alcohol, and a mixture of two or more thereof.

6. The process of claim 4, wherein one or more additional hop acids selected from the group consisting of a tetrahydroiso-alpha-acid, a hexahydroiso-alpha-acid and a dihydroiso-alpha-acid is added to the solution.

* * * * *